United States Patent [19]

Stein

[11] Patent Number: 6,010,143
[45] Date of Patent: Jan. 4, 2000

[54] HITCH RECEIVER CLAMP

[76] Inventor: John P. Stein, 14087 State Hwy. 15, Stearns, Minn. 55353

[21] Appl. No.: 08/920,797

[22] Filed: Aug. 29, 1997

[51] Int. Cl.[7] .................................. B60D 1/01; A41F 1/00
[52] U.S. Cl. .................................... 280/506; 24/514
[58] Field of Search .................... 280/506, 505, 280/507; 24/68 C, 68 D, 525, 569, 514

[56] References Cited

U.S. PATENT DOCUMENTS

| | | | |
|---|---|---|---|
| 2,448,744 | 9/1948 | Strader | 280/506 |
| 3,091,881 | 6/1963 | Evans | 24/68 D |
| 3,535,751 | 10/1970 | Batchelor | 24/263 |
| 4,318,501 | 3/1982 | Graber | 24/525 |
| 5,344,175 | 9/1994 | Speer | 280/506 |
| 5,593,172 | 1/1997 | Breslin | 280/506 |
| 5,735,539 | 4/1998 | Kravitz | 280/506 |

*Primary Examiner*—Lanna Mai
*Assistant Examiner*—Jeff Restifo
*Attorney, Agent, or Firm*—Albert W. Watkins

[57] ABSTRACT

An anti-rattle, locking hitch receiver clamp has a lever arm, a hand screw at one end thereof, a force plate at an end opposite the hand screw, and a pivot located therebetween, but closer to the active edge. The clamp may be slipped onto a first shank such as a trailer ball shank, and then the first shank inserted into a hollow receiver such as a trailer hitch receiver. The hand screw is then rotated and, through the pivot, the clamp applies a multiplied force between the shank and receiver. The clamp will then securely retain the shank within the receiver without rattle or vibration therebetween. A trailer hitch pin may be used for the pivot, though other variations of design and materials are disclosed.

6 Claims, 2 Drawing Sheets

HITCH RECEIVER CLAMP

BACKGROUND OF THE INVENTION

1. Field of the Invention

This invention pertains to clamps generally, and particularly to locking clamps useful for vehicle hitch receivers and other similar apparatus to prevent motion or rattling.

2. Description of the Related Art

Passenger vehicles are well adapted to transport people, as they were designed to do, and will readily transport small cargo such as grocery sacks and briefcases. People, however, do not always choose to rely upon passenger vehicles for transportation. During outings, such as week-end trips, vacations or competitions, other modes of transportation are often desired. Skis, canoes or bicycles may be integral to the outing. The recreational enthusiast knows the value of quiet leisure away from the hustle and bustle of the city, but must somehow find a way to carry both passengers and additional transportation equipment to the place of leisure. The competitor must get to and from the competitions, and will want to preserve the equipment for competition.

The method of transporting equipment should not detract from the goal of the outing, be it leisure or competition, nor should it cause any damage to the passenger vehicle. Unfortunately, in the past these simple goals have each been contrary to each other. A multitude of roof-top racks and carriers have been designed for either permanent or temporary mounting. These carriers are usually designed and manufactured to be compatible with one or a limited number of vehicles, since each vehicle is sized and shaped uniquely.

While the permanent variety usually are more reliable in load carrying, they are also usually installed at the factory to carefully control installation and thereby prevent any leakage or damage which might otherwise occur. Moreover, they permanently add to the size of the vehicle, and also generally detract from the vehicle's appearance.

Temporary carriers have been designed from diverse materials and geometries, including materials such as foam block, foam pad, rubber, plastic, metal and wood. To reduce the inventory required by a vendor to sell the temporary carrier, common vehicle features are used to attempt to provide the necessary support for cargo. For example, gutters are often found around vehicle doors, and a number of carriers clamp onto these gutters. Unfortunately, not all vehicles have features such as gutters, and so several different carriers must still be designed. Other carriers rely on the roof of the vehicle to provide both load bearing and also a place for friction, suction or magnetic grab. These temporary carriers have a tendency to be more temporary than planned or desired, occasionally allowing the cargo to slip and either be damaged or damage the vehicle. Such an event is totally unacceptable and will render a carrier useless.

In addition to the other challenges, roof-top carriers present an obstacle during loading and unloading. The equipment must somehow be placed on top of the vehicle without damaging either the vehicle or the equipment. Yet, the reason the equipment is being placed on top of the vehicle is because of large size and/or great bulk.

Other prior art carriers have been designed to mount on the bumper of a vehicle. While this type of carrier is often easier to load and unload, the limitations related to different vehicle designs found with the roof top carriers are still present. Different vehicles have different bumper designs. Some of the most modern vehicles offer no access to the bumper at all, and so different carriers must still be designed and stocked to accommodate different vehicles.

Given the limitations of the prior art, it is not surprising that there has been a relative explosion in carriers designed to install directly into a hitch receiver. The hitch receiver acts as a universal coupling into which trailer balls for utility and boat trailers may be attached, and the hitch receiver may also be used to directly support a carrier. Like the bumper carrier, a hitch receiver carrier provides the advantage of easy equipment loading. In addition, hitch receivers have become standard to several sizes, two sizes in particular being the most common. The large size, a two inch receiver, is designed for high loads and may be specified, for example, for trailers as large as 3,500 pounds and tongue weights as great as 350 pounds. For smaller loads, typically up to 2,000 pounds and tongue weights of 200 pounds, a one and one-quarter inch hitch receiver is used.

While the hitch receiver designs have vastly eased the problems of different vehicle designs, there are still limitations therein that manufacturers have not been able to satisfactorily address. One limitation is the variability of the receiver opening and the hitch outer dimensions, which should desirably fit tightly within the receiver opening.

Another problem with hitch receiver carriers is when they support relatively large loads. The carrier is on a long arm extending from the receiver. When acceleration occurs in a vertical direction, the receiver is carrying the load exactly as it was designed for. Unfortunately, events such as acceleration, bumps and cornering lead to forces which are not always directly vertical. Particularly with the long vertical arm, forces transverse to the vehicle are amplified at the hitch. The carrier may sway or pivot undesirably within the receiver.

The carrier may also rattle or chatter within the receiver. This may occur when a carrier is installed in the hitch receiver, or may even occur if a trailer ball is placed therein. The hitch receiver coupling by nature must be an imperfect fit that allows relative motion between the hitch receiver and a hitch or trailer ball shank, so that the hitch or shank may be inserted into the receiver and removed therefrom. The need for an imperfect fit also means a loose fitting which is prone to chatter and rattling, which although not normally detrimental to performance, is annoying.

Finally, there are two different standard receiver sizes that must be accommodated. When a trailer ball shank or carrier is designed for the one and one-quarter inch receiver, it heretofore could not be used on the two inch receiver, since the quantity of motion relative to the receiver would be destructive.

One prior art anti-rattle device for use on a hitch receiver is illustrated in U.S. Pat. No. 5,593,172 to Breslin, the contents and appropriate teachings which are incorporated herein by reference. Breslin discloses a square collar having a number of screw holes therein. The collar is of sufficient diameter to fit around the hitch receiver and hitch. Screws that pass through some of the screw holes provide clamping forces to the hitch receiver, and the collar is designed to be a relatively permanent attachment to the hitch receiver. Each time a hitch is inserted into the hitch receiver, a special hand adjustment screw is tightened to press against the hitch and thereby force the hitch against the hitch receiver.

The Breslin device is limited in several important aspects. The many screws and screw holes illustrated by Breslin are costly, time consuming, and, due to their size and quantity, easy to lose during shipping and storage. In operative state, the increasing numbers of screws will also increase the likelihood that one of the screws will loosen or fail during operation, due to manufacturing tolerances and other factors, such as greater variability in torques applied to each screw. The small screws may readily be stripped either at the threaded shaft or at the screw head, making it difficult and undesirable to change the collar from one hitch receiver to another. Finally, the maximum force that may be applied through the Breslin design is determined directly by the torque applied at the screw, which may not be sufficient in all instances, or, as aforementioned, may lead a user to attempt to apply too much torque and thereby accidentally destroy the screw threads or screw head.

The prior art limitations on adaptability are particularly apparent when several different types of hitches or hitch receivers may be encountered. For example, a vehicle may have a two inch receiver and need to attach therein a two inch carrier and a one and one-quarter inch trailer ball shank. Each should fit tightly within the two inch receiver and not rattle, wear or require any significant screwing or clamping to make the different combinations work. Furthermore, more than one vehicle may be equipped with a hitch receiver, and each of the combinations of hitches and carriers should likewise be readily interchangeable between vehicle receivers.

SUMMARY OF THE INVENTION

The limitations of the prior art are overcome in the present invention, which in a first manifestation comprises a clamp for applying clamping forces between a first object and a second object that comprises a pivot arm having a first end and a second end which extends longitudinally therebetween; a means for variably applying a force to the first object adjacent a first end of the pivot arm; a first surface adjacent the second end of the pivot arm for applying a force to the second object; and a means for limiting motion between the first object and clamp located between the first and second ends of the pivot arm and interconnected thereto so as to form a pivot point therewith.

In another manifestation, the present invention comprises a clamp for clamping together a first object and a second object telescopically engaged therewith, comprising a pivot arm having a first end and a second end and a midsection therebetween, the second end pressing against the second object; an extensible press adjacent and mechanically coupled to the pivot arm first end and pressing against the first object; and a pivot connected to the pivot arm between the ends of the pivot arm but closer to the second end than the first end.

In a further manifestation, the present invention is a trailer hitch receiver lock comprising a pivot arm having a first end and a second end and a midsection therebetween; a threaded rod adjacent the first end and passing through a hole therein; a mating thread supported by the pivot arm engaging with the threaded rod; and a pivot operatively connected between the first and second ends but offset from center therebetween.

OBJECTS OF TIE INVENTION

A first object of the present invention is to prevent the attendant rattling and twisting common in other prior art receiver type carriers. A second object of the present invention is to preserve the advantages of ease and adaptability inherent in hitch receivers over other mounting methods of the prior art. A third object of the present invention is to provide a way of attaching a shank of much smaller dimension into a larger hitch receiver without rattle or vibration therebetween. Another object of the invention is to provide a hitch receiver clamp that will clamp to hitch receivers of diverse sizes and geometries. Another object of the invention is to provide a hitch receiver clamp that has broader application and may be used to clamp diverse objects besides hitches and hitch receivers. These and other advantages are achieved in the preferred and alternative embodiments of the invention, which are described hereinbelow in conjunction with the drawing figures. To keep the drawings as legible as possible, while still clearly identifying unique features, identical features have not been renumbered in the figures subsequent to FIG. 1, except for reference and bearing purpose, and will be understood to be the same as those of FIG. 1.

DESCRIPTION OF THE PREFERRED EMBODIMENT

Figure 1:
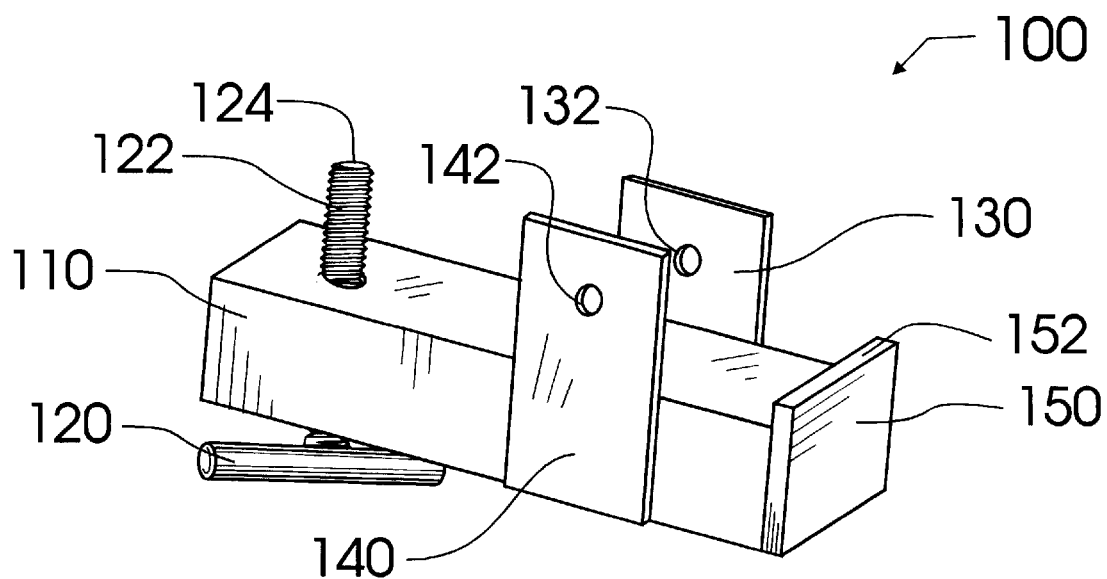
FIG. 1 illustrates the preferred embodiment of the invention from a projected view and detached from any object to be clamped.

FIG. 1 illustrates the preferred embodiment hitch receiver clamp 100 generally. Hitch receiver clamp 100 is used to prevent relative motion between a hitch receiver and carriers such as shown, for example, in my copending application entitled "Carrier for a Trailer-Hitch Receiver" filed Aug. 22, 1997, the contents of which are incorporated herein by reference. That copending application also demonstrates other applications for the present invention, the teachings of which are specifically incorporated herein. Hitch receiver clamp 100 will also have utility with other types of hitches, shanks and balls that fit within or about a hitch receiver, whether these hitches are attached to a carrier, boat, trailer or other device.

Hitch receiver clamp 100 has a lever arm 110 which serves as a main structural support for the remaining components, as well as acting as a lever to multiply forces. Arm 110 may be solid, tubular. U-shaped or have other geometry, so long as it serves the structural purposes described. While material is not critical, ordinary mild steel or carbon steel has been found to work satisfactorily. Extending through arm 110 at one end thereof is hand screw 120, having threads 122 and a protruding tip 124. Tip 124 may be manufactured to have a variety of geometries and may be made from or coated with a multitude of special materials which are known to benefit the present application.

At the end of arm 110 opposite hand-screw 120 is force plate 150 having active edge 152. Between force plate 150 and hand screw 120, but closer to force plate 150, are pin support plates 130, 140. Pin support plates 130, 140 may be manufactured from steel strap and welded directly to arm 110. Plates 130, 140 have holes 132 and 142, respectively, drilled through.

Figure 2:
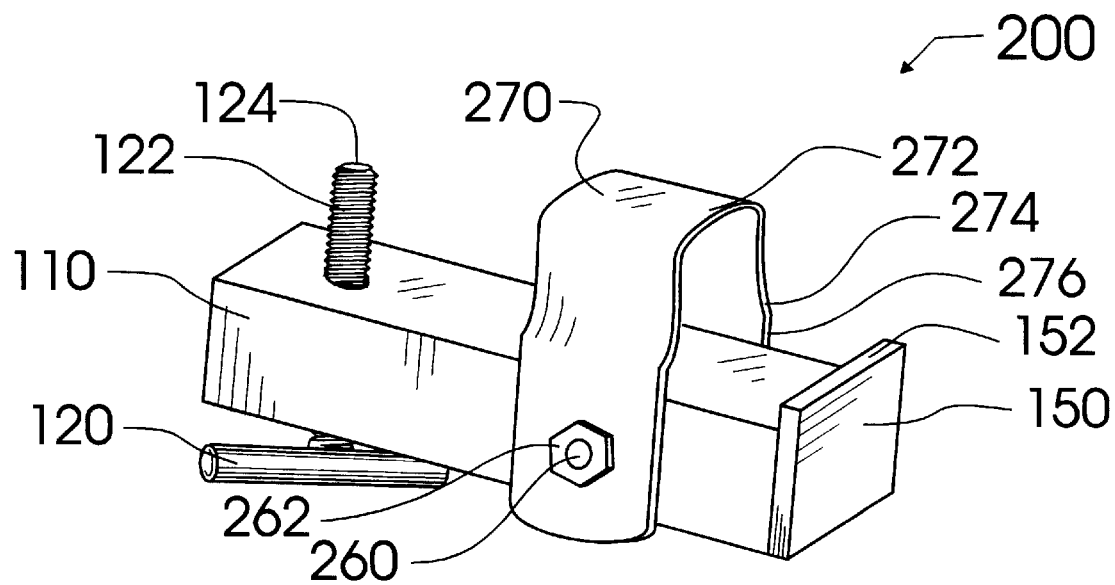
FIG. 2 illustrates an alternative embodiment of FIG. 1 from a similar projected view.

FIG. 2 illustrates an alternative embodiment hitch receiver clamp 200 generally. Hitch receiver clamp 200 has a lever arm 110, hand screw 120 having threads 122 and a protruding tip 124, and force plate 150 having active edge 152, each similar in construction and function to the like numbered elements of hitch receiver clamp 100. However, unlike clamp 100, between force plate 150 and hand screw 120, but closer to force plate 150, is retention strap 270. Retention strap 270 has a flat surface 272 which bends sharply to flair 274, and gently widens to strap section 276. Within strap section 276 is a small hole through which bolt 260 may pass, and be held at the end by nut 262.

Figure 3:
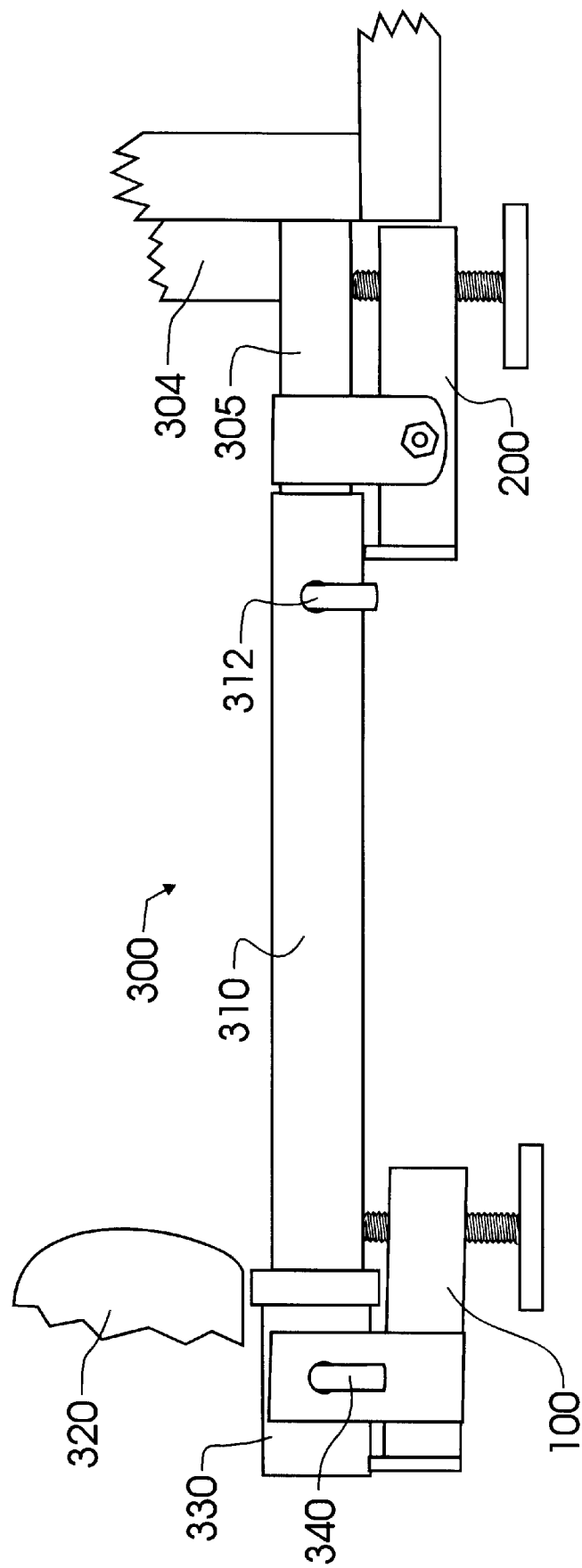
FIG. 3 illustrates both the preferred and alternative embodiments in one application from a side view.

The operation of hitch receiver clamps 100 and 200 will be more apparent from a review of FIG. 3 which illustrates one application. Therein, receiver extension 300 includes a tube 310 which is most preferably a square steel tube having holes near each end. At one end, tube 310, which might for example be two inch square tubing, is inserted into vehicle receiver 330 and retained there by hitch pin 340. To prevent unwanted rattle, vibration, torque and wear between tube 310 and receiver 330, hitch receiver clamp 100 is arranged and aligned with hitch pin 340 so that hitch pin 340 passes through pin support plate holes 132, 142. Clamp 100 will then hang freely from pin 340. Clamp 100 is then positioned so that active edge 152 of force plate 150 is pressing against receiver 50 by turning hand screw 120 until tight, with protruding tip 124 pressing tightly against tube 310. As may be observed, lever arm 110 multiplies the force on tip 124 by the ratio of the length from pin 340 and hand screw 120 to the length from pin 340 to force plate 150. In other words, if the pin 340 is twice as far from hand screw 120 as it is from force plate 150, then the force on active edge 152 will be twice the force on tip 124. By multiplying the force this way, it is relatively easy for a person to very securely clamp down and lock tube 310 to receiver 330.

At the other end of tube 310, carrier hitch 305 is inserted into tube 310 and pinned by hitch pin 312, but not until after clamp 200 has been slipped thereon. Carrier hitch 305 may be two inch tubing, but it may alternatively be one and one-quarter inch tubing, which would ordinarily not stay within tube 310 without severely damaging both tube 310 and hitch 305. However, by tightening down clamp 200, hitch 305 will be securely retained without damage.

As is apparent, clamp 100 offers simpler manufacturing and fewer piece parts than clamp 200. Furthermore, clamp 100 requires the user to install a pin such as hitch pin 340, which ensures safe coupling, even if clamp 100 should somehow fail. Clamp 100 may readily be used with a variety of receiver sizes, since the only real dimensional constraint to so fit is the spacing between plates 130 and 140, and the diameter of holes 132, 142.

Clamp 200 does not require pin 312, which will be particularly advantageous in those applications where a pin is not available or desired. As a result, clamp 200 may be used in virtually any application requiring the coupling of two objects where one is inserted inside the other. The objects may be poles, square tubes, or other geometry, and may or may not be telescoping. The two objects may not even be of similar material.

Clamp 200 additionally pulls carrier hitch 305 towards clamp 200 with the force well distributed across strap 270, ensuring good force distribution and consistent results. Furthermore, clamp 200 will reliably keep the outer surface of hitch 305 closest to clamp 200 tightly pressed against the inner surface of tube 310 which is closest to clamp 200.

The operation of clamp 100 depends upon whether pin 340 presses against tube 310 or receiver 330. In those cases where pin 340 presses against tube 310, clamp 100 will perform similarly to clamp 200. However, when pin 340 presses instead against receiver 330, there will be no force multiplication, since the pulling force on pin 340 towards clamp 100 will be transmitted through receiver 330 and be offset by active edge 152. Remaining force on pin 340 will be produced directly by hand screw 120 pressing up on tube 310, which is pushing tube 310 away from clamp 100. Note that this is opposite the direction clamp 200 was pushing tube 310, and opposite the direction which was attained with clamp 100 if pin 340 engaged tube 310. Therefore, to take fullest advantage of the force multiplication possible with the present invention, it is important that pin 340 engages with tube 310, by, for example, ensuring that tube 310 has a hole of smaller diameter or more highly located than the hole in receiver 330.

As is apparent, both active edge 152 and tip 124 will be exposed to substantial forces. For applications which might demand greater strength, anti-slip characteristics, abrasion resistance, anti-marring and other special characteristics, there are well-known geometries and coatings which are considered to be incorporated herein with the present invention. Such special materials and coatings are not strictly limited to active edge 152 and tip 124 either. For example, arm 110 may include nylon within the threaded region through which threads 122 pass, to prevent accidental loosening thereof, and strap 270 may be made from or coated with a variety of materials to prevent marring or for other benefit. Such selections of materials will be considered to be incorporated into the present invention in light of the present teachings.

Furthermore, force plate 150 is not essential to the operation of the invention. For example, lever arm 110 may be used directly to apply the force, thereby reducing piece parts and manufacturing. However, force plate 150 is preferred to keep lever arm 110 more parallel to tube 310, where it functions best. Additionally, where receivers have a flared or enlarged end, such as illustrated on receiver 330, force plate 150 may help to provide clearance therefrom.

Additional adaptations are possible. For example, more permanent installations are possible by welding or otherwise attaching strap 270 directly to a device such as carrier 305. Clamp 200 may be permanently retained thereto and be immediately useful upon installation within a tube such as tube 310 or within a receiver such as receiver 330.

While the foregoing details what are felt to be the preferred embodiments of the invention, no material limitations to the scope of the claimed invention are intended. Further, features and design alternatives that would be obvious to one of ordinary skill in the art are considered to be incorporated herein. Specific materials, different arrangements of basic components illustrated herein, special coatings and other such deviations are taught by the present disclosure and deemed included herewith, even where not specifically recited. The scope of the invention is set forth and particularly described in the claims hereinbelow.

I claim:

1. A clamp for applying clamping forces between a towing vehicle trailer attachment and a trailer attachment, comprising:

a means for generating a first force and delivering said first force to a first one of said towing vehicle trailer attachment and said trailer attachment;

a means for multiplying said first force to create a second force proportional to and responsive to said first force that is greater than said first force;

a means for securely, rigidly and positively attaching said multiplying means to said first one of said towing vehicle trailer attachment and said trailer attachment, said attaching means having a strap extending about said multiplying means and forming an opening therewith through which said first one of said towing vehicle trailer attachment and said trailer attachment may pass, said strap pivotally attached to said multiplying means by a pivotal attachment means; and a means for applying said second force to a second one of said towing vehicle trailer attachment and said trailer attachment, wherein said second one of said towing vehicle trailer attachment and said trailer attachment is different from said first one of said towing vehicle trailer attachment and said trailer attachment;

whereby said towing vehicle trailer attachment and said trailer attachment are clamped together by said second force reliably.

2. An anti-rattle trailer hitch receiver lock for locking a first object to a trailer hitch receiver, without rattle or play therebetween, comprising:

a pivot arm having a first end and a second end and a center therebetween;

a threaded rod adjacent said first end and passing through a hole in said pivot arm;

a mating thread supported by said pivot arm engaging with said threaded rod; and a strap extending about said pivot arm and forming a fully encircled opening therewith through which said first object passes and engages rigidly, positively and securely with said strap, said strap pivotally attached to said pivot arm by a pivotal attachment means and operatively connected between said first end and said second end but offset from center therebetween closer to said second end;

whereby, upon rotation of said threaded rod in a first direction, said threaded rod applies a first force to said pivot arm adjacent said first end tending to separate said pivot arm from said first object and whereby said strap applies a second force counter to said first force, thereby forcing said pivot arm to pivot and multiply said first force at said second end.

3. The anti-rattle trailer hitch receiver lock of claim 2 wherein said strap is permanently affixed to said first object.

4. The anti-rattle trailer hitch receiver lock of claim 2 wherein pivot arm is below said trailer hitch receiver, whereby said pivot arm provides reinforcement to said receiver and said first object during differential motion therebetween.

5. A clamp for clamping together a first object and a second object telescopically engaged with said first object comprising:

a pivot arm having a first end and a second end and a midsection therebetween, said second end pressing against said second object;

an extensible press adjacent and mechanically coupled to said first end of said pivot arm and pressing against said first object;

a strap extending about said pivot arm and forming an opening therewith through which said first object passes and engages with said strap, said strap pivotally attached to said pivot arm by a pivotal attachment means within said midsection at a point closer to said second end than said first end.

6. The clamp of claim 5 wherein said strap is permanently affixed to said first object.

* * * * *